(12) United States Patent
Inagawa

(10) Patent No.: US 10,967,726 B2
(45) Date of Patent: Apr. 6, 2021

(54) CONTROLLER AND CONTROL METHOD FOR HYBRID SYSTEM

(71) Applicant: TOYOTA JIDOSHA KABUSHIKI KAISHA, Toyota (JP)

(72) Inventor: Tomokazu Inagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/745,599

(22) Filed: Jan. 17, 2020

(65) Prior Publication Data

US 2020/0290446 A1 Sep. 17, 2020

(30) Foreign Application Priority Data

Mar. 11, 2019 (JP) .............................. JP2019-043659

(51) Int. Cl.
| | | |
|---|---|---|
| *B60K 6/387* | (2007.10) | |
| *B60W 20/40* | (2016.01) | |
| *H02K 7/04* | (2006.01) | |
| *B60W 10/02* | (2006.01) | |
| *B60K 6/26* | (2007.10) | |

(52) U.S. Cl.
CPC ........... *B60K 6/387* (2013.01); *B60W 10/026* (2013.01); *B60W 20/40* (2013.01); *H02K 7/04* (2013.01); *B60K 2006/262* (2013.01)

(58) Field of Classification Search
CPC ..... B60K 6/387; B60W 10/026; B60W 20/40; H02K 7/04
See application file for complete search history.

(56) References Cited

FOREIGN PATENT DOCUMENTS

| JP | 2010-276121 A | 12/2010 |
| JP | 2011-213310 A | 10/2011 |

*Primary Examiner* — Sean Gugger
(74) *Attorney, Agent, or Firm* — Oblon, McClelland, Maier & Neustadt, L.L.P.

(57) ABSTRACT

A controller for a hybrid system is provided. A clutch is disposed between a crankshaft and a drive shaft of an electric motor. An engine-side rotating body rotates integrally with the crankshaft. A motor-side rotating body rotates integrally with the drive shaft. The controller performs balance control. In the balance control, the controller causes the engine-side rotating body and the motor-side rotating body to rotate relative to each other by bringing the clutch into the slipping state. Thereafter, the controller switches the clutch to the engaged state such that the position of the center of gravity of the engine-side rotating body and the position of the center of gravity of the motor-side rotating body are farther from each other in the circumferential direction than before bringing the clutch into the slipping state.

7 Claims, 7 Drawing Sheets

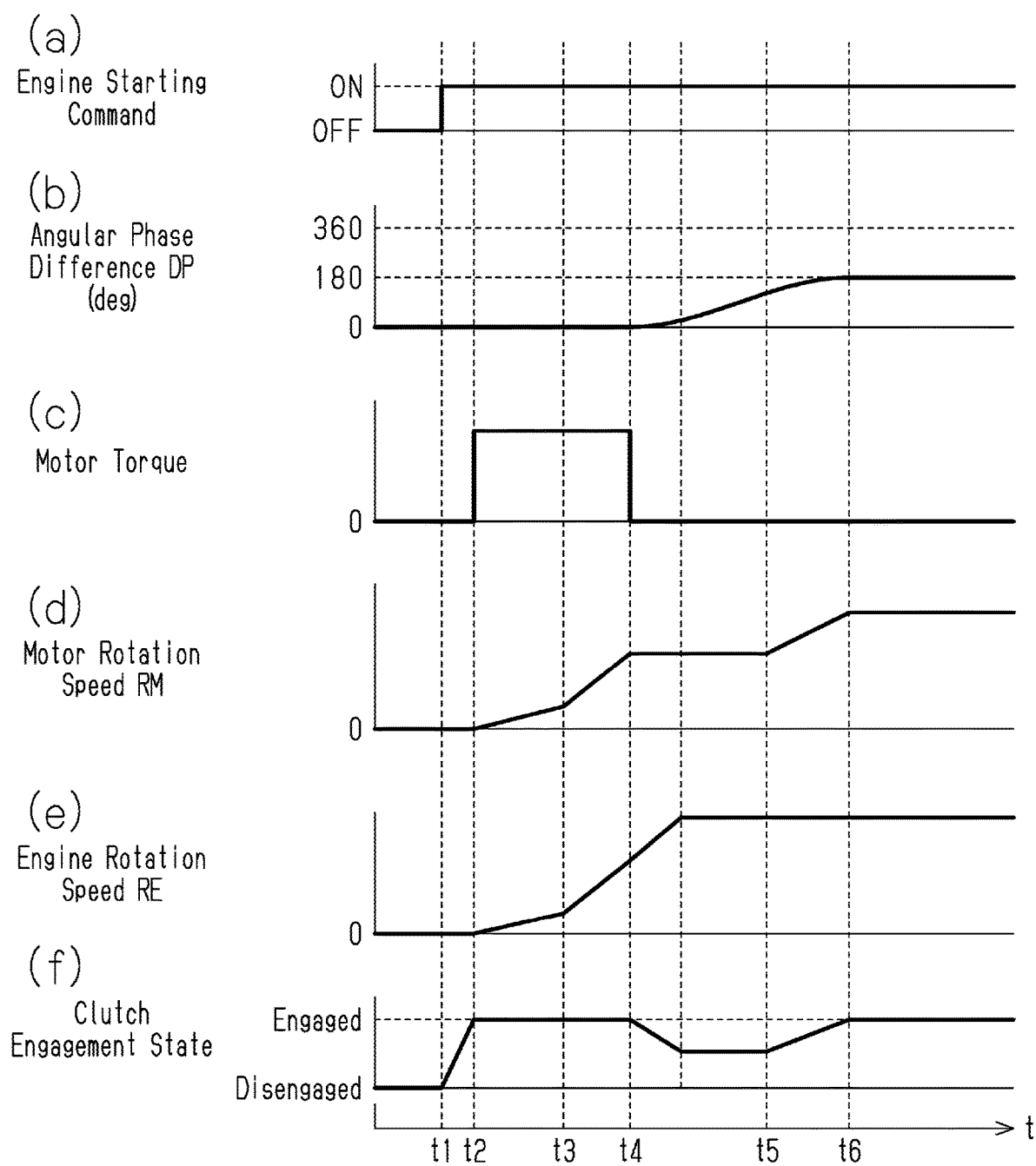

CONTROLLER AND CONTROL METHOD FOR HYBRID SYSTEM

BACKGROUND

1. Field

The present disclosure relates to a controller and a control method for a hybrid system.

2. Description of Related Art

Japanese Laid-Open Patent Publication No. 2011-213310 discloses a hybrid vehicle in which the crankshaft of the internal combustion engine and the drive shaft of the electric motor are connected to each other via a clutch. The clutch is switched among an engaged state, a slipping state, and a disengaged state. When the clutch is in the engaged state, rotation torque can be transmitted between the crankshaft of the internal combustion engine and the drive shaft of the electric motor, and the crankshaft and the drive shaft rotate integrally. When the clutch is in the slipping state, rotation torque can be transmitted between the crankshaft of the internal combustion engine and the drive shaft of the electric motor, while the crankshaft and the drive shaft rotate relative to each other to some extent. When the clutch is in the disengaged state, rotation torque cannot be transmitted between the crankshaft of the internal combustion engine and the drive shaft of the electric motor. At the start-up of the internal combustion engine, the rotation torque generated by the electric motor is transmitted to the crankshaft of the internal combustion engine by bringing the clutch into the engaged state or the slipping state. The crankshaft is thus cranked.

In a hybrid vehicle such as that disclosed in the above document, the center of gravity of the engine-side rotating body, which is arranged between the clutch and the internal combustion engine, is inevitably displaced from the center line of rotation due to manufacturing errors and the like. Likewise, the center of gravity of the motor-side rotating body, which is arranged between the clutch and the motor, is inevitably displaced from the center line of rotation. When the clutch is in the engaged state, the engine-side rotating body and the motor-side rotating body are coupled to each other to rotate integrally. In this state, as the center of gravity of the engine-side rotating body and the center of gravity of the motor-side rotating body become closer to each other in the circumferential direction as viewed in the direction of the center line of rotation, the center of gravity of the entirety of the components that rotate integrally, that is, the center of gravity of the combination of the engine-side rotating body and the motor-side rotating body becomes more displaced from the center line of rotation. The more displaced the center of gravity of the entirety of the components that rotate integrally, the more likely that those components will cause vibration and noise when rotating.

SUMMARY

Examples of the present disclosure will now be described.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example 1

A controller employed in a hybrid system is provided. The hybrid system includes an internal combustion engine as a drive source, an electric motor as a drive source different from the internal combustion engine, and a clutch that is disposed between a crankshaft of the internal combustion engine and a drive shaft of the electric motor. The clutch is configured to be switched among an engaged state, in which rotation torque is transmitted between the crankshaft and the drive shaft without relative rotation between the crankshaft and the drive shaft, a slipping state, in which rotation torque is transmitted between the crankshaft and the drive shaft with relative rotation between the crankshaft and the drive shaft, and a disengaged state, in which rotation torque cannot be transmitted between the crankshaft and the drive shaft. The hybrid system includes an engine-side rotating body that rotates integrally with the crankshaft and a motor-side rotating body that rotates integrally with the drive shaft. The controller is configured to perform balance control. In the balance control, the controller causes the engine-side rotating body and the motor-side rotating body to rotate relative to each other by bringing the clutch into the slipping state, and then switches the clutch to the engaged state such that a position of a center of gravity of the engine-side rotating body and a position of a center of gravity of the motor-side rotating body are farther from each other in a circumferential direction than before bringing the clutch into the slipping state.

The above-described configuration causes the engine-side rotating body and the motor-side rotating body to rotate integrally when the clutch is in the engaged state. In this state, the position of the center of gravity of the engine-side rotating body and the position of the center of gravity of the motor-side rotating body are more separated from each other than before the clutch performs the balance control. Thus, when viewed in the direction of the center line of rotation, the center of gravity of the entirety of the components that rotate integrally is closer to the center line of rotation than before the balance control is performed. This reduces the displacement of the center of gravity of the entirety of the components that rotate integrally from the center line of rotation. As a result, even if the clutch is in the engaged state, so that the engine-side rotating body and the motor-side rotating body rotate integrally, vibration is unlikely to be caused in the hybrid vehicle.

Example 2

The controller of Example 1 may be configured to perform the balance control in response to the internal combustion engine being started by driving the electric motor in a state in which the internal combustion engine and the electric motor are both in a stopped state.

In a comparative example, in a state in which the internal combustion engine and the electric motor are in a stopped state, the motor-side rotating body and the motor-side rotating body are each in a stopped state such that the center of gravity is located below the center line of rotation due to by its own weight. Thus, if the clutch is engaged in this state to continue integral rotation of the engine-side rotating body and the motor-side rotating body, the engine-side rotating body and the motor-side rotating body rotate with the center of gravity of the entirety of the components that rotate integrally being significantly displaced from the center line of rotation. In contrast, the above-described configuration engages the engine-side rotating body and the motor-side rotating body with each other in a state in which the position of the center of gravity of the engine-side rotating body and the position of the center of gravity of the motor-side rotating body are separated from each other in the circumferential direction as compared to a state in which the positions of the centers of gravity are close to each other in the circumferential direction. The configuration thus can avoid a situation where vibration is caused easily.

Example 3

The controller of Example 2 may be configured to bring the clutch into the engaged state before the electric motor is driven when the internal combustion engine is started, and perform the balance control after the starting of the internal combustion engine is completed by driving the electric motor.

This configuration completes the start-up of the internal combustion engine at an earlier stage than in a case in which the internal combustion engine is started while the balance control is being performed.

Example 4

The controller of Example 2 or 3 may be configured to start the balance control simultaneously with completion of the starting of the internal combustion engine.

In a comparative example, in a case in which the balance control is performed after a time interval from completion of the start-up of the internal combustion engine, the rotation of the drive shaft of the electric motor is varied. This is likely to cause the user to experience an uneasy feeling. The rotation speed of the crankshaft significantly changes until the start-up of the internal combustion engine is completed. Thus, the above-described configuration performs the balance control subsequent to completion of the start-up of the internal combustion engine. Therefore, even if the balance control changes the rotation speed of the drive shaft of the electric motor, the user is unlikely to experience an uneasy feeling.

Example 5

The controller of any one of Examples 2 to 4 may be configured such that the clutch includes a clutch disk configured to transmit rotation torque by friction, a center of gravity of the clutch disk may be on a center line of rotation in the slipping state of the balance control, specified time is defined in advance as an amount of time taken for the center of gravity of the clutch disk to reach the center line of rotation in the slipping state of the balance control, and the controller is configured to cause time during which the clutch is in the slipping state in the balance control to be longer than or equal to the specified time.

When the internal combustion engine and the electric motor are in a stopped state, the clutch disks are displaced downward due to the gravity. If the clutch is engaged in this state, the clutch disks rotate with the center of gravity of the clutch disks being displaced from the center line of rotation as viewed in the direction of the center line of rotation. The more displaced the center of gravity of the clutch disks from the center line of rotation, the more likely that vibration and noise will be caused when the clutch disks rotate. In this regard, the above-described configuration causes the center of gravity of the clutch disks to approach the rotation axis of the crankshaft when the clutch is brought into the slipping state during the balance control. Then, the center of gravity of the clutch disks is substantially moved to match the center line of rotation during the period of time in which the clutch is in the slipping state in the balance control. This suppresses vibration of the vehicle that is caused by displacement of the center of gravity of the clutch disks from the rotation axis of the crankshaft.

Example 6

A method for controlling a hybrid system is provided that performs the various processes described in any one of Examples 1 to 5.

Example 7

A non-transitory computer readable memory medium is provided that stores a program that causes a processor to perform the various processes described in any one of Examples 1 to 5.

Other features and aspects will be apparent from the following detailed description, the drawings, and the claims.

BRIEF DESCRIPTION OF THE DRAWINGS

FIG. 4 is a timing diagram illustrating the first embodiment, where section (a) shows ON and OFF of the start-up command of the internal combustion engine, section (b) shows changes in the angular phase difference, section (c) shows changes in the output torque of the motor-generator, section (d) shows changes in the rotation speed of the motor-generator, section (e) shows changes in the rotation speed of the internal combustion engine, and section (f) shows the engagement state of the clutch.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of the present disclosure will be described with reference to FIGS. 1 to 5D.

First, the schematic configuration of a hybrid system 10 in a hybrid vehicle according to the first embodiment will be described.

Figure 1:
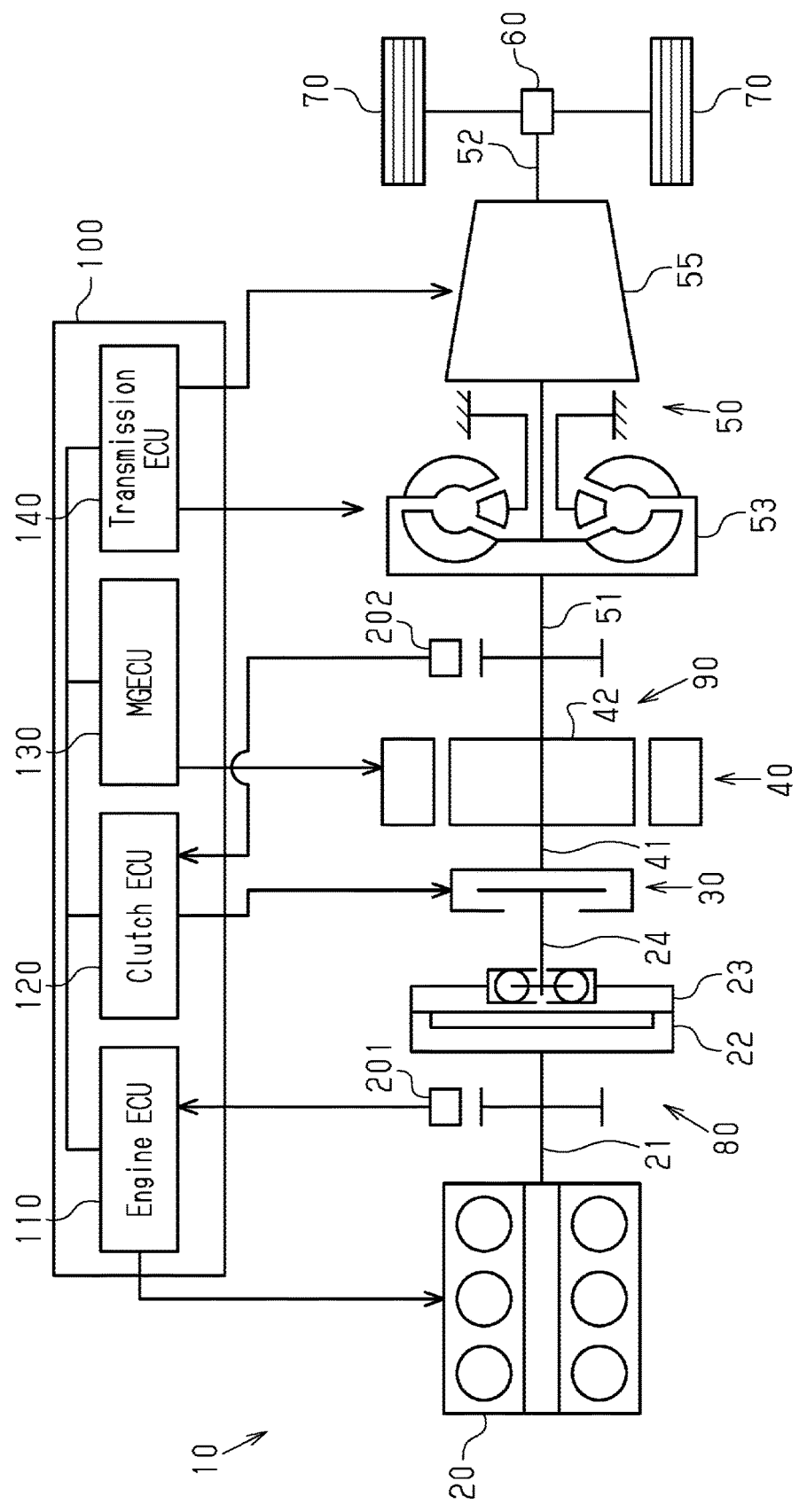
FIG. 1 is a schematic diagram of a hybrid system according to a first embodiment of the present disclosure.

As shown in FIG. 1, the hybrid system 10 includes an internal combustion engine 20, which is a drive source of the vehicle. The internal combustion engine 20 has multiple cylinders and burns fuel supplied to the cylinders to rotate a crankshaft 21.

The internal combustion engine 20 includes a substantially disk-shaped flywheel 22 attached to an end of the crankshaft 21. The flywheel 22 is an inertial body having an appropriate weight and stabilizes the rotation speed of the internal combustion engine 20 to smooth rotation of the crankshaft 21.

A substantially disk-shaped torsional damper 23 is attached to the flywheel 22. The torsional damper 23 absorbs torsion in the rotation direction of the crankshaft 21, thereby reducing the torsion in rotation of the crankshaft 21.

A driven shaft 24 is attached to the torsional damper 23. The driven shaft 24 rotates integrally with the crankshaft 21 as the crankshaft 21 rotates.

Figure 2:
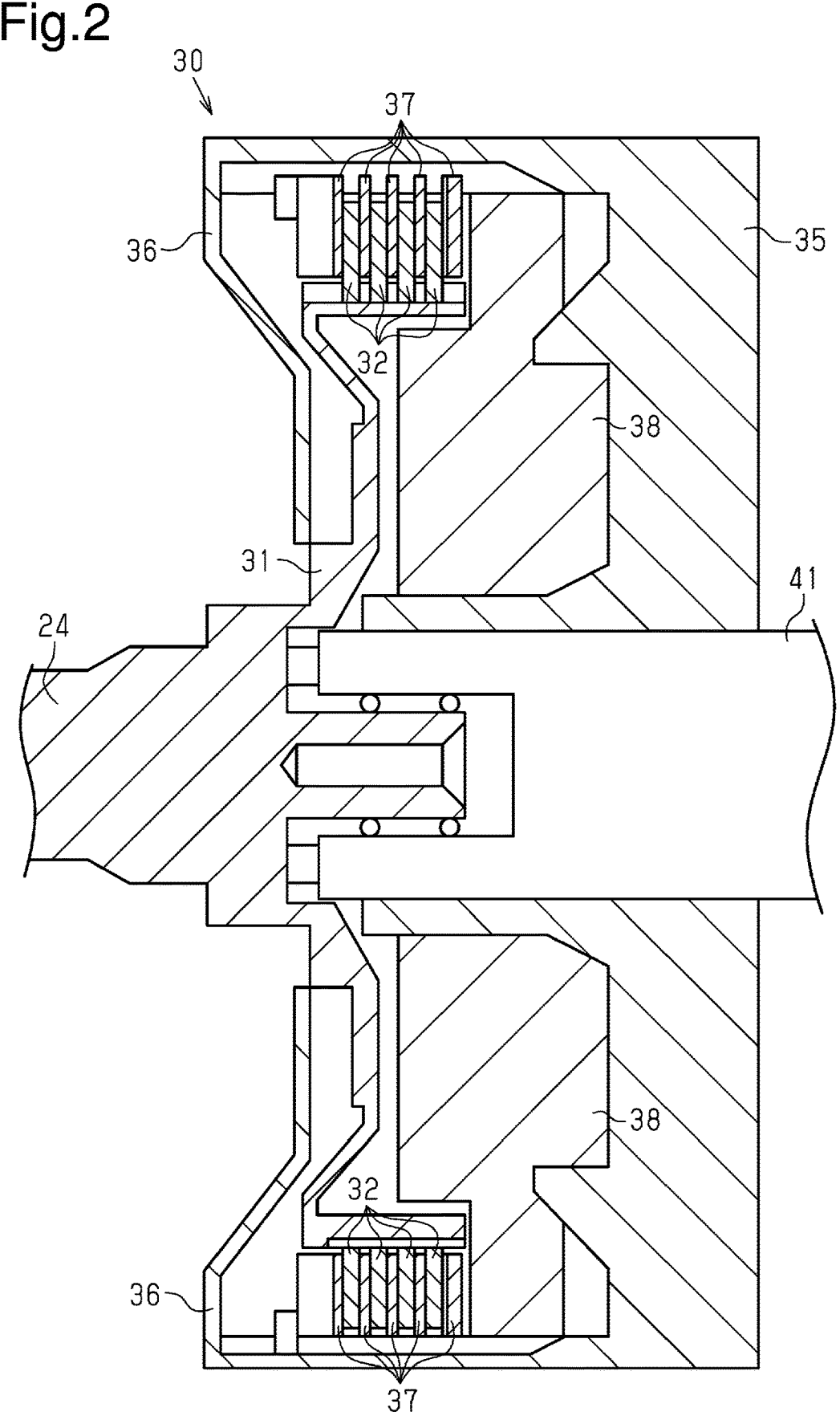
FIG. 2 is a schematic cross-sectional view showing the clutch of the hybrid system of FIG. 1.

The driven shaft 24 is connected to a drive shaft 41 of a motor-generator 40 via a clutch 30. As shown in FIG. 2, a substantially disk-shaped hub 31 is attached to the end of the driven shaft 24 on the side corresponding to the clutch 30. Substantially disk-shaped separator plates 32 protrude in the radial direction from the outer circumferential surface of the hub 31. The separator plates 32 are spaced apart from each other in the axial direction of the hub 31.

A drum 35, which has a cylindrical shape with a closed end, is coupled to the end of the drive shaft 41 of the motor-generator 40 on the side corresponding to the clutch 30. The drum 35 opens toward the internal combustion engine 20. The drum 35 accommodates the hub 31 and the separator plates 32. The opening of the drum 35 is closed by a lid 36 so as to cover the hub 31 and the separator plates 32. Multiple clutch disks 37 protrude inward in the radial direction from the inner circumferential surface of the drum 35. The clutch disks 37 and the separator plates 32 are arranged alternately, and each clutch disk 37 is opposed to the corresponding separator plate 32. Although not illustrated in detail, a hydraulic piston mechanism 38 is provided in the drum 35. The piston mechanism 38 displaces the clutch disks 37 toward the lid 36, so that the clutch disks 37 are frictionally engaged with the separator plates 32. In the present embodiment, the hub 31, the separator plates 32, the drum 35, the lid 36, the clutch disks 37, and the piston mechanism 38 constitute the clutch 30.

The clutch 30 is hydraulically switched among an engaged state, a slipping state, and a disengaged state. When the clutch 30 is in the disengaged state, the hydraulic pressure in the clutch 30 is low, so that the clutch disks 37 and the separator plates 32 are separated from each other. That is, the clutch disks 37 and the separator plates 32 are in a non-contact state. Thus, when the clutch 30 is in the disengaged state, rotation torque cannot be transmitted between the crankshaft 21 of the internal combustion engine 20 and the drive shaft 41 of the motor-generator 40.

When the clutch 30 is in the engaged state, the hydraulic pressure in the clutch 30 is high, so that the clutch disks 37 are pressed against the separator plates 32. That is, the frictional force between the clutch disks 37 and the separator plates 32 is appropriately great. Thus, when the clutch 30 is in the engaged state, the clutch disks 37 and the separator plates 32 are completely engaged with each other. Accordingly, the driven shaft 24 and the drive shaft 41 of the motor-generator 40 are directly connected to each other, so as to rotate integrally without rotating relative to each other. Therefore, rotation torque can be transmitted between the crankshaft 21 of the internal combustion engine 20 and the drive shaft 41 of the motor-generator 40.

When the clutch 30 is in the slipping state, the hydraulic pressure in the clutch 30 is higher than that when the clutch 30 is in the disengaged state and lower than that when the clutch 30 is in the engaged state. Thus, the clutch disks 37 and the separator plates 32 are not engaged with each other completely, while the clutch disks 37 are pressed against the separator plates 32. This allows the driven shaft 24 and the drive shaft 41 of the motor-generator 40 to rotate relative to each other to some extent. In this case, since the clutch disks 37 are pressed against the separator plates 32, rotation torque can be transmitted between the crankshaft 21 and the drive shaft 41. Also, when the clutch 30 is in the slipping state, slipping control is performed to control the amount of slipping of the clutch 30. Accordingly, the degree of relative rotation between the driven shaft 24 and the drive shaft 41 of the motor-generator 40 can be controlled.

As shown in FIG. 1, the drive shaft 41 of the motor-generator 40 is connected to a rotor 42 of the motor-generator 40. The drive shaft 41 of the motor-generator 40 rotates integrally with the rotor 42 of the motor-generator 40. When the motor-generator 40 functions as an electric motor serving as a drive source of the vehicle, the output torque of the motor-generator 40 is output to the drive shaft 41. When the motor-generator 40 functions as a generator, the motor-generator 40 receives input torque from the drive shaft 41.

The drive shaft 41 of the motor-generator 40 is connected to an input shaft 51 of the transmission mechanism 50. The transmission mechanism 50 includes a torque converter 53, which has a lockup clutch, and a transmission portion 55, which changes the gear ratio.

The transmission portion 55 includes several gears. When one of the gears is selected, rotation of the input shaft 51 is reduced by a reduction ratio corresponding to the selected gear and output to an output shaft 52. The output shaft 52 of the transmission mechanism 50 is connected to right and left driven wheels 70 via a differential gear 60.

When the clutch 30 is in the disengaged state, the crankshaft 21, the flywheel 22, the torsional damper 23, and the driven shaft 24 rotate integrally as the crankshaft 21 rotates.

That is, the crankshaft 21, the flywheel 22, the torsional damper 23, and the driven shaft 24 function as an engine-side rotating body 80.

When the clutch 30 is in the disengaged state, the drive shaft 41 of the motor-generator 40, the rotor 42, the input shaft 51 of the transmission mechanism 50, and the torque converter 53 rotate integrally as the drive shaft 41 of the motor-generator 40 rotates. That is, the drive shaft 41 of the motor-generator 40, the rotor 42, the input shaft 51, and the torque converter 53 function as a motor-side rotating body 90.

The hybrid system 10 includes a controller 100, which controls the hybrid system 10 in a centralized manner.

The controller 100 of the present embodiment includes an engine ECU 110, a clutch ECU 120, and a motor-generator ECU (hereinafter, abbreviated as MGECU 130), and a transmission ECU 140. The ECUs of the controller 100 are connected to the controller area network (CAN) communication line. The ECUs are configured to transmit and receive various types of signals via the CAN communication line.

The controller 100 receives signals from various sensors of the vehicle on which the hybrid system 10 is mounted.

The engine ECU 110 receives a detection signal that indicates the position of the crankshaft 21 of the internal combustion engine 20 from a crank angle sensor 201. The crank angle sensor 201 is arranged in the vicinity of the crankshaft 21 and detects the rotational position of the crankshaft 21 in relation to a reference position of the crankshaft 21.

Based on signals input to the controller 100, the engine ECU 110 controls operation of components of the internal combustion engine 20 such as a throttle valve and ignition plugs such that the rotation torque of the internal combustion engine 20 matches a desired value.

The engine ECU 110 determines whether to start the internal combustion engine 20 based on a signal input from an accelerator pedal (not shown) and the remaining power of the high-voltage battery, which stores power for driving the motor-generator 40. The engine ECU 110 then delivers signals representing a start-up command for starting the internal combustion engine 20 to the ECUs.

The clutch ECU 120 receives a detection signal that indicates the position of the drive shaft 41 of the motor-generator 40 from a drive shaft angle sensor 202. The drive shaft angle sensor 202 is arranged in the vicinity of the drive shaft 41 and detects the rotational position of the drive shaft 41 in relation to a reference position of the drive shaft 41.

The clutch ECU 120 controls the clutch 30 based on a signal input to the controller 100. Specifically, when receiving a signal indicating that the internal combustion engine 20 will be started from the engine ECU 110, the clutch ECU 120 controls the clutch 30 to bring the clutch 30 into the engaged state or the slipping state. Accordingly, the clutch ECU 120 drives the motor-generator 40 to start the internal combustion engine 20.

Figure 5A:
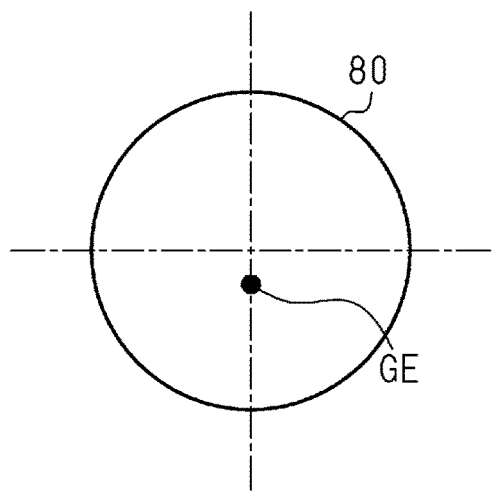
FIG. 5A is a diagram illustrating the center of gravity of the engine-side rotating body.
Figure 5B:
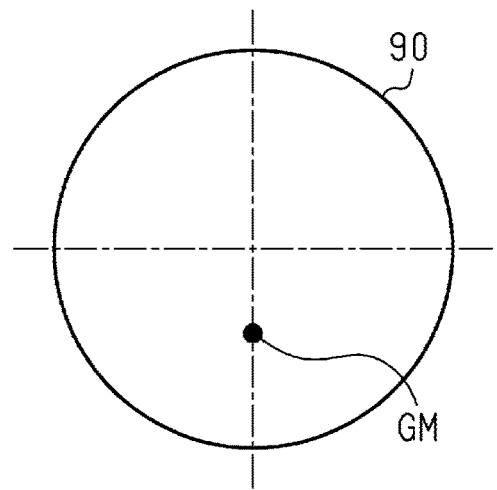
FIG. 5B is a diagram illustrating the center of gravity of the motor-side rotating body.

The clutch ECU 120 performs balance control based on the signal input to the controller 100. Specifically, the clutch ECU 120 brings the clutch 30 into the slipping state, such that an angular phase difference DP becomes 180 degrees through relative rotation of the engine-side rotating body 80 and the motor-side rotating body 90. The angular phase difference DP is defined in the following manner. The center of rotation when the crankshaft 21 and the drive shaft 41 rotate integrally as viewed in the direction of the rotation axis is defined as a center of rotation C. The center of gravity of the engine-side rotating body 80 is defined as an engine-side center of gravity GE. The center of gravity of the motor-side rotating body 90 is defined as a motor-side center of gravity GM. The angular phase difference DP is defined, when viewed in the direction of the rotation axis, as the angle formed by the straight line connecting the engine-side center of gravity GE and the center of rotation C and the straight line connecting the motor-side center of gravity GM and the center of rotation C as shown in FIG. 5D.

As shown in FIG. 1, the MGECU 130 controls the operation of the motor-generator 40 based on a signal from the ignition switch (not shown) and signals input to the controller 100. Specifically, when the motor-generator 40 is in a stopped state, the MGECU 130 drives the motor-generator 40 when receiving, from the engine ECU 110, a signal indicating that the engine ECU 110 will start the internal combustion engine 20.

The transmission ECU 140 controls the transmission mechanism 50 based on the signal input to the controller 100. Specifically, the transmission ECU 140 controls the engagement state of the lockup clutch of the torque converter 53 and shifting of the gear of the transmission portion 55.

The balance control will now be described, which is performed when the internal combustion engine 20 is started by driving the motor-generator 40 in a state in which the internal combustion engine 20 and the motor-generator 40 are both in a stopped state.

When the engine ECU 110 of the controller 100 outputs a signal representing a start-up command for starting the internal combustion engine 20 by driving the motor-generator 40, the controller 100 performs the series of processes described below.

Figure 3:
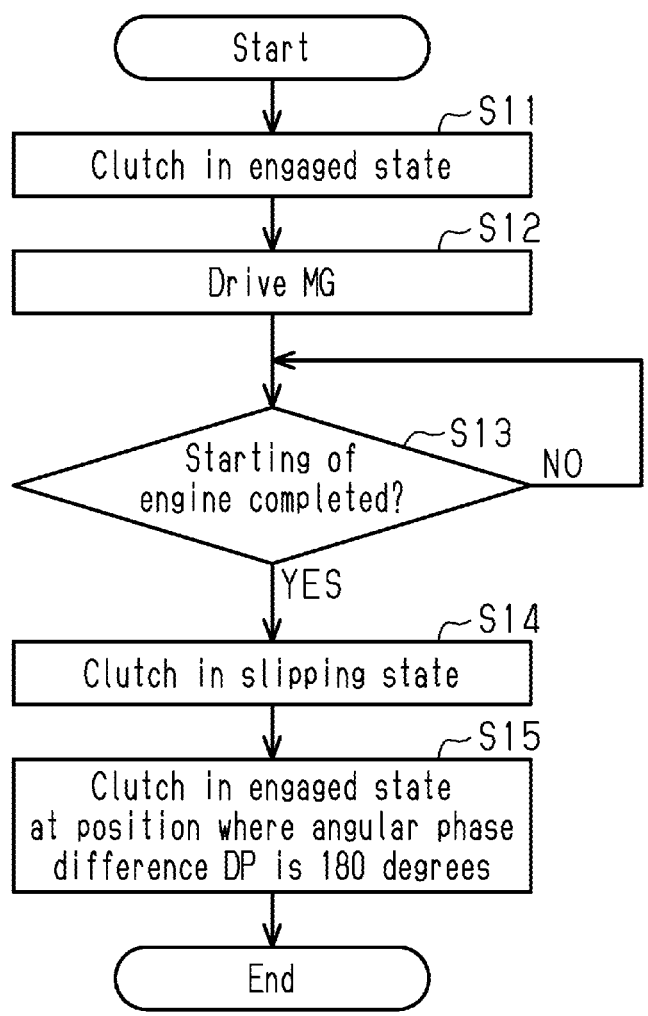
FIG. 3 is a flowchart of a process of switching the clutch according to the first embodiment of the present disclosure in the hybrid system of FIG. 1.

As shown in FIG. 3, the clutch ECU 120 of the controller 100 first initializes the angular phase difference DP to 0 degrees in step S11. Then, the clutch ECU 120 switches the clutch 30 to the engaged state. Thereafter, the controller 100 advances the process to step S12.

In step S12, the MGECU 130 of the controller 100 drives the motor-generator 40. As described above, at step S12, the clutch 30 is in the engaged state. Thus, if the motor-generator 40 is driven, the crankshaft 21 is cranked to initiate the start-up of the internal combustion engine 20. Thereafter, the controller 100 advances the process to step S13.

Concurrently with step S13, the engine ECU 110 of the controller 100 causes the rotation torque of the motor-generator 40 to be transmitted to the internal combustion engine 20 and controls combustion in each cylinder of the internal combustion engine 20 using the ignition plug.

In step S13, the engine ECU 110 of the controller 100 determines whether the start-up of the internal combustion engine 20 has been completed. Specifically, the engine ECU 110 calculates an engine rotation speed RE, which is the number of revolutions of the crankshaft 21 per unit time, from a detection value of the crank angle sensor 201. The engine ECU 110 determines whether the start-up of the internal combustion engine 20 has been completed by comparing the engine rotation speed RE with a predetermined threshold. The predetermined threshold is a value at which the internal combustion engine 20 can operate in a self-sustaining manner. The predetermined threshold is set to several hundred rpm, for example. When the engine rotation speed RE is lower than the predetermined threshold (S13: NO), the controller 100 repeats the process of step S13. In contrast, when the engine rotation speed RE is higher than or equal to the predetermined threshold (S13: YES), the controller 100 advances the process to step S14.

In step S14, the clutch ECU 120 of the controller 100 starts the balance control. Step S14 is executed immediately after it is determined that the engine rotation speed RE is higher than or equal to the predetermined threshold. That is, the balance control is started simultaneously with the completion of the start-up of the internal combustion engine 20. In the balance control in step S14, the MGECU 130 first stops the operation of the motor-generator 40. The clutch ECU 120 then switches the clutch 30 to the slipping state. Subsequently, the clutch ECU 120 of the controller 100 keeps the clutch 30 in the slipping state for a period of time longer than or equal to a specified time TD, which has been set in advance as an amount of time taken for the center of gravity of the clutch disks 37 to match the rotation axis of the drive shaft 41. Thereafter, the controller 100 advances the process to step S15.

The specified time TD is defined as an amount of time from when the downward displacement of the clutch disks 37 is maximized to when the center of gravity of the clutch disks 37 reaches the rotation axis. For example, in a test, the clutch 30 is brought into the slipping state with the downward displacement of the clutch disks 37 maximized. Then, the motor-side rotating body 90 is rotated at the rotation speed of the motor-generator 40 at the time of completion of start-up of the internal combustion engine 20. At this time, the amount of time from when the rotation of the motor-side rotating body 90 is started to when the center of gravity of the clutch disks 37 reaches the rotation axis is measured to define the specified time TD.

In step S15, the clutch ECU 120 of the controller 100 controls the clutch 30 such that switching of the clutch 30 to the engaged state is completed when the angular phase difference DP becomes 180 degrees. Thereafter, the controller 100 ends the series of processes in the balance control related to the angular phase difference DP when starting the internal combustion engine 20 by the current operation of the motor-generator 40.

When controlling the clutch 30 in step S15, the clutch ECU 120 controls the clutch 30 considering time lag due to hydraulic pressure. Generally, the hydraulic pressure is increased when switching the clutch 30 from the slipping state to the engaged state. It therefore takes a certain amount of time to switch from when the hydraulic pressure starts being increased to when the hydraulic pressure reaches the level of the engaged state. The clutch ECU 120 performs the balance control considering the slipping amount of the clutch 30 during the switching time. Specifically, when switching the clutch 30 from the slipping state to the engaged state, the clutch 30 starts being switched from the slipping state to the engaged state when the angular phase difference DP becomes a predetermined angle smaller than 180 degrees in the balance control. Since the slipping amount of the clutch 30 continues to increase during the switching time, the switching of the clutch 30 to the engaged state is completed when the angular phase difference DP becomes 180 degrees.

In step S15 of the present embodiment, the clutch 30 starts being switched from the slipping state to the engaged state when the angular phase difference DP becomes 160 degrees, which is smaller than 180 degrees by 20 degrees. The angular phase difference DP at which switching to the engaged state is started is determined in advance in a test or the like. For example, at the engine speed RE that becomes substantially constant after completion of the start-up of the internal combustion engine 20, the slipping amount of the clutch 30 in the switching time, in which the clutch 30 is switched from the slipping state to the engaged state, is obtained through a test. Next, it is only necessary to obtain the value that is smaller than 180 degrees by the amount corresponding to the slipping amount obtained through the test, and employ the obtained value as the angular phase difference DP at the time of starting to switch the clutch 30 from the slipping state to the engaged state.

As described above, in the balance control of steps S14 and S15, the clutch ECU 120 first brings the clutch 30 into the slipping state to cause the engine-side rotating body 80 and the motor-side rotating body 90 to rotate relative to each other. Then, the clutch ECU 120 completes switching of the clutch 30 to the engaged state when the position of the engine-side center of gravity GE, which is the center of gravity of the engine-side rotating body 80, and the position of the motor-side center of gravity GM, which is the center of gravity of the motor-side rotating body 90, are separated by 180 degrees in the circumferential direction.

The operation of the first embodiment will now be described.

As shown in section (a) of FIG. 4, before the point in time t1, at which a start-up command for starting the internal combustion engine 20 is issued, the engagement state of the clutch 30 is the disengaged state as shown in section (f) of FIG. 4. Before the point in time t1, the engine rotation speed RE, which is the rotation speed of the internal combustion engine 20, is zero as shown in section (e) of FIG. 4. That is, the internal combustion engine 20 is in a stopped state before the point in time t1. At this time, as shown in FIG. 5A, the engine-side rotating body 80 is in a stopped state at a position where the engine-side center of gravity GE, which is the center of gravity of the engine-side rotating body 80, is at a lower position when viewed in the direction of the rotation axis of the crankshaft 21. That is, in this case, the engine-side center of gravity GE is vertically below the rotation axis of the crankshaft 21 when viewed in the direction of the rotation axis of the crankshaft 21.

Likewise, as shown in section (d) of FIG. 4, before the point in time t1, at which the start-up command for starting the internal combustion engine 20 is issued, the motor rotation speed RM, which is the rotation speed of the motor-generator 40, is zero. That is, the motor-generator 40 is in a stopped state before the point in time t1. At this time, as shown in FIG. 5B, the motor-side rotating body 90 is in a stopped state at a position where the motor-side center of gravity GM, which is the center of gravity of the motor-side rotating body 90, is at a lower position when viewed in the direction of the rotation axis of the drive shaft 41. That is, in this case, the motor-side center of gravity GM is vertically below the rotation axis of the drive shaft 41 when viewed in the direction of the rotation axis of the drive shaft 41.

Figure 5C:
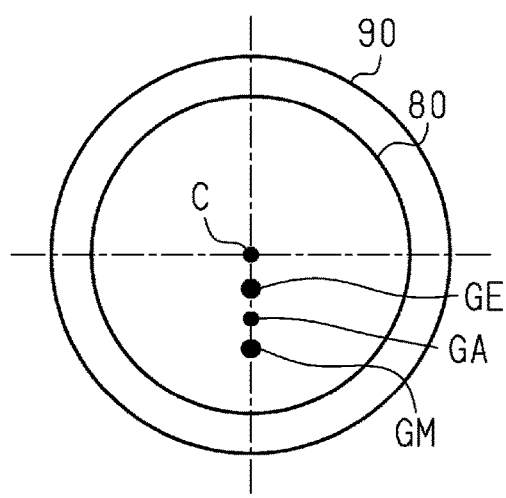
FIG. 5C is a diagram illustrating a state in which the angular phase difference between the engine-side rotating body and the motor-side rotating body is zero degrees.
Figure 5D:
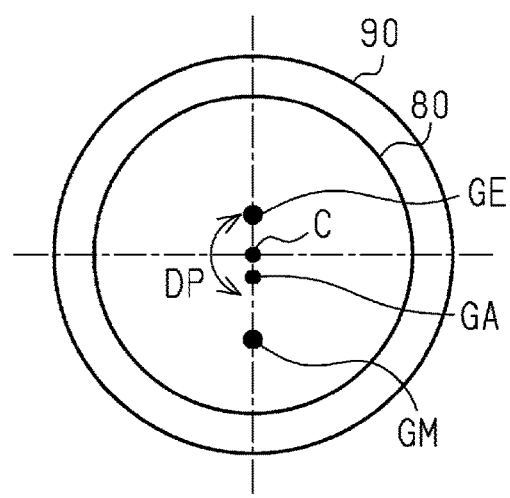
FIG. 5D is a diagram illustrating a state in which the angular phase difference between the engine-side rotating body and the motor-side rotating body is 180 degrees.

Accordingly, before the point in time t1, at which the start-up command for starting the internal combustion engine 20 is issued, the engine-side center of gravity GE and the motor-side center of gravity GM are both likely to be located directly below the rotation center of rotation C as shown in FIG. 5C. Therefore, in the present embodiment, the angular phase difference DP is initialized to zero degrees in this state. If the combination of the engine-side rotating body 80 and the motor-side rotating body 90 is regarded as the entirety of the driven body, a total center of gravity GA, which is the center of gravity of the entirety of the driven body, is located between the engine-side center of gravity GE and the motor-side center of gravity GM in FIG. 5C. The entirety of the driven body refers to the entirety of the components that rotate integrally. If the clutch 30 is in the engaged state in this state, the center of gravity of the entirety of the driven body as viewed in the direction of the rotation axis of the crankshaft 21 and the drive shaft 41, that is, the total center of gravity GA, which is the center of gravity of the combination of the engine-side rotating body 80 and the motor-side rotating body 90, is far from the center of rotation C, which is the rotation axis when viewed in the direction of the rotation axis. Thus, when the angular phase difference DP changes, the total center of gravity GA is farthest from the center of rotation C when the angular phase difference DP is zero degrees.

Thereafter, as shown in section (a) of FIG. 4, the engine ECU 110 of the controller 100 outputs a start-up command for starting the internal combustion engine 20 at the point in time t1. At the point in time t1, the clutch 30 starts being switched from the disengaged state to the engaged state as shown in section (f) of FIG. 4.

Then, switching of the clutch 30 to the engaged state is completed at the point in time t2. At the point in time t2, at which the clutch 30 is switched to the engaged state, the motor-generator 40 outputs torque capable of starting the internal combustion engine 20 as shown in section (c) of FIG. 4. At the point in time t2, the motor rotation speed RM starts increasing as shown in section (d) of FIG. 4, and the internal combustion engine 20 starts being rotated by driving the motor-generator 40 as shown in section (e) of FIG. 4. Accordingly, the engine rotation speed RE starts increasing. At this stage, since the clutch 30 is in the engaged state, the engine-side rotating body 80 and the motor-side rotating body 90 rotate integrally, and the angular phase difference DP between these remains zero degrees.

Thereafter, at the point in time t3, at which fuel injection is started in the internal combustion engine 20, combustion is started in the internal combustion engine 20, so that the engine rotation speed RE is rapidly increased as shown in section (e) of FIG. 4. Also, the motor rotation speed RM rapidly increases at the point in time t3 as shown in section (d) of FIG. 4.

Thereafter, as shown in section (e) of FIG. 4, at the point in time t4, at which the engine rotation speed RE reaches the predetermined threshold, which is set to a value at which the internal combustion engine 20 can continue to operate in a self-sustaining manner, the clutch 30 starts being switched to the slipping state in the balance control as shown in section (f) of FIG. 4. At this point, the operation of the motor-generator 40 is stopped. After the point in time t4, the drive shaft 41 of the motor-generator 40 slips so as to rotate relative to the crankshaft 21 of the internal combustion engine 20. Thus, as shown in sections (d) and (e) of FIG. 4, the motor rotation speed RM has a value smaller than the engine rotation speed RE. In the present embodiment, the hydraulic pressure of the clutch 30 is controlled such that the motor rotation speed RM remains constant during the period in which the clutch 30 is in the slipping state.

Thereafter, at the point in time t5, at which the angular phase difference DP becomes 160 degrees as shown in section (b) of FIG. 4, the clutch 30 starts being switched to the engaged state as shown in section (f) of FIG. 4. At the point in time t5, the slipping amount of the engine-side rotating body 80 and the motor-side rotating body 90 becomes smaller than that when the clutch 30 is in the slipping state. Thus, the motor rotation speed RM starts being increased by transmitting the rotation torque of the crankshaft 21 to the drive shaft 41.

Thereafter, at the point in time t6, at which the angular phase difference DP becomes 180 degrees, switching of the clutch 30 to the engaged state is completed. At this time, as shown in sections (d) and (e) of FIG. 4, the motor rotation speed RM and the engine rotation speed RE match each other. Also, when the angular phase difference DP is 180 degrees, the engine-side center of gravity GE and the motor-side center of gravity GM are located on the opposite sides of the center of rotation C as shown in FIG. 5D. Accordingly, the total center of gravity GA is close to the center of rotation C.

As shown in section (f) of FIG. 4, the period of time from the point in time t4, at which the clutch 30 is switched to the slipping state, to the point in time t6, at which the clutch 30 is switched to the engaged state, is longer than or equal to the predetermined specified time TD. The specified time TD is set to a period of time in which the center of gravity of the clutch disks 37 can reach the rotation axis of the crankshaft 21 and the drive shaft 41.

The advantages of the above-described first embodiment will now be described.

(1) In the first embodiment, the engine-side rotating body 80 and the motor-side rotating body 90 rotate integrally after the clutch 30 is brought into the engaged state through the balance control. At this time, the angular phase difference DP has been changed to 180 degrees from 0 degrees, which is the value prior to the balance control. That is, the position of the engine-side center of gravity GE and the position of the motor-side center of gravity GM are likely to be farthest from each other in the circumferential direction as compared to the state before the balance control. Accordingly, the total center of gravity GA as viewed along the center line of rotation when the engine-side rotating body 80 and the motor-side rotating body 90 rotate integrally is located close to the center of rotation C. This reduces the displacement of the total center of gravity GA from the center line of rotation. As a result, vibration is unlikely to be caused in the hybrid vehicle when the clutch 30 is brought into the engaged state so that the engine-side rotating body 80 and the motor-side rotating body 90 rotate integrally.

(2) In the first embodiment, the balance control is performed when the start-up of the internal combustion engine 20 is initiated by driving the motor-generator 40 in a state in which the internal combustion engine 20 and the motor-generator 40 are both in a stopped state. Thus, the angular phase difference DP when the balance control is started can be regarded as zero degrees as shown in section (b) of FIG. 4. That is, the position of the engine-side center of gravity GE and the position of the motor-side center of gravity GM can be regarded as being closest to each other in the circumferential direction. Therefore, by performing the balance control from this state, the position of the engine-side center of gravity GE and the position of the motor-side center of gravity GM are separated from each other in the circumferential direction by at least a slight amount. This configuration avoids the situation in which the engine-side rotating body 80 and the motor-side rotating body 90 continue rotating in a state where the angular phase difference DP is zero degrees and vibration is thus most likely to be caused.

(3) In the first embodiment, slipping of 180 degrees is performed from the state in which the angular phase difference DP can be regarded as zero degrees. That is, by regarding the angular phase difference DP before starting the balance control as zero degrees, the slipping amount can be set to a fixed value when changing the angular phase difference DP to 180 degrees by the balance control. Thus, the clutch ECU 120 does not need to calculate the slipping amount in the balance control together with the angular phase difference DP before starting the balance control. Accordingly, positional information of the engine-side center of gravity GE and the motor-side center of gravity GM does not need to be stored in advance. This eliminates the necessity of storing the positional information, in the controller 100, the engine-side center of gravity GE and the motor-side center of gravity GM before the vehicle is shipped out.

(4) In the first embodiment, the balance control is started at the point in time t4, at which start-up of the internal combustion engine 20 is completed by driving the motor-generator 40 as shown in section (f) of FIG. 4. Thus, the start-up of the internal combustion engine 20 is completed at an earlier stage than in a case in which the internal combustion engine 20 is started while the balance control is being performed. In a comparative example in which the balance control is performed after a time interval from completion of the start-up of the internal combustion engine 20, the rotation of the drive shaft 41 of the motor-generator 40 is varied. This is likely to cause the user to experience an uneasy feeling. In this regard, in the first embodiment, since the rotation speed of the internal combustion engine 20 changes greatly until the start-up of the internal combustion engine 20 is completed, the balance control is performed subsequent to the completion of the start-up of the internal combustion engine 20. This is unlikely to cause the user to experience an uneasy feeling. That is, even if the rotation speed of the motor-generator 40 changes due to changes by the balance control, the balance control is performed continuously from the start-up of the internal combustion engine 20, in which the rotation speed of the internal combustion engine 20 greatly changes.

(5) When the clutch 30 is in the disengaged state and the drive shaft 41 of the motor-generator 40 is in a stopped state, the drive shaft 41 is tilted by the weight of the drum 35 attached to the end of the drive shaft 41 and the clutch disks 37. In a comparative example, the clutch disks 37 face the separator plates 32 at a position that is displaced downward. That is, if the clutch 30 is switched to the engaged state in this state, the clutch disks 37 rotate with the center of gravity of the clutch disks 37 being displaced from the center line of rotation as viewed in the direction of the center line of rotation. The more displaced the center of gravity of the clutch disks 37 from the center line of rotation, the more likely that vibration and noise will be caused when the clutch disks 37 rotate.

(5) If the drive shaft 41 of the motor-generator 40 rotates when the clutch 30 is in the disengaged state or the slipping state, the rotation of the motor-side rotating body 90 restores the tilt of the drive shaft 41 such that the drive shaft 41, which rotates in a tilted state, rotates on the rotation axis of the drive shaft 41. That is, the center of gravity of the clutch disks 37 is moved to the rotation axis. Thus, in the first embodiment, when the clutch 30 is brought into the slipping state through the balance control, the center of gravity of the clutch disks 37 approaches the rotation axis of the crankshaft 21. Then, the center of gravity of the clutch disks 37 is substantially moved to match the center line of rotation during the period of time in which the clutch 30 is in the slipping state in the balance control. This configuration suppresses vibration of the hybrid vehicle due to displacement of the center of gravity of the clutch disks 37 from the center line of rotation.

Second Embodiment

A balance control performed by a controller 100 according to a second embodiment of the present disclosure will now be described with reference to FIGS. 6 and 7. In the second embodiment, like or the same reference numerals are given to those components that are like or the same as the corresponding components of the first embodiment. Specific description of these components is omitted or simplified.

In the second embodiment, the clutch ECU 120 stores in advance the position of the engine-side center of gravity GE, which is the center of gravity of the engine-side rotating body 80 in relation to the reference position of the crankshaft 21. The clutch ECU 120 calculates the rotational position of the engine-side center of gravity GE from the information on the rotational position of the crankshaft 21 in relation to the reference position of the crankshaft 21, which has been detected by the crank angle sensor 201, and the position of the engine-side center of gravity GE in relation to the reference position of the crankshaft 21.

The clutch ECU 120 stores in advance the position of the motor-side center of gravity GM, which is the center of gravity of the motor-side rotating body 90, in relation to the reference position of the drive shaft angle sensor 202. The clutch ECU 120 calculates the rotational position of the motor-side center of gravity GM from the information on the rotational position of the drive shaft 41 in relation to the reference position of the drive shaft 41, which has been detected by the drive shaft angle sensor 202, and the position of the motor-side center of gravity GM in relation to the reference position of the drive shaft 41. The clutch ECU 120 calculates the angular phase difference DP between the engine-side center of gravity GE and the motor-side center of gravity GM from the calculated rotational position of the engine-side center of gravity GE and the calculated rotational position of the motor-side center of gravity GM.

The balance control will now be described, which is performed when the internal combustion engine 20 is started by driving the motor-generator 40 while the internal combustion engine 20 is in a stopped state and the motor-generator 40 is being driven. The clutch 30 is in the disengaged state when the internal combustion engine 20 is in a stopped state and the motor-generator 40 is driven.

When the engine ECU 110 of the controller 100 outputs the start-up command for starting the internal combustion engine 20 by driving the motor-generator 40 based on a signal from the accelerator pedal, the controller 100 executes the series of processes shown below. The following series of processes is executed, for example, when the desired torque cannot be delivered to the driven wheels 70 solely by the motor-generator 40.

In the present embodiment, during the following series of processes, the clutch ECU 120 of the controller 100 constantly calculates the angular phase difference DP based on signals delivered from the crank angle sensor 201 and the drive shaft angle sensor 202.

Figure 6:
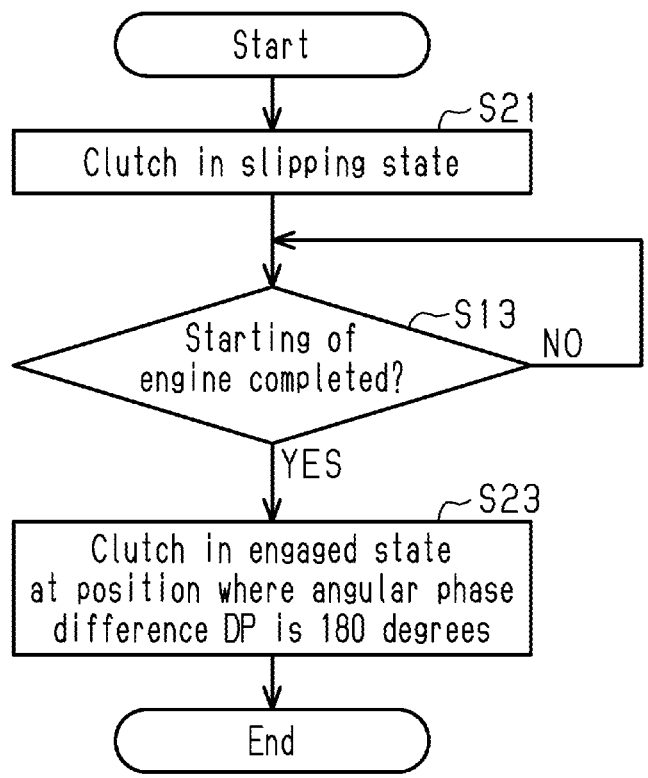
FIG. 6 is a flowchart of a process of switching a clutch according to a second embodiment of the present disclosure.

As shown in FIG. 6, in step S21, the clutch ECU 120 of the controller 100 switches the clutch 30 from the disengaged state to the slipping state, thereby initiating the start-up of the internal combustion engine 20. As described above, at step S12, the motor-generator 40 is being driven. Thus, if the clutch 30 is brought into the slipping state, the crankshaft 21 is cranked. This initiates the start-up of the internal combustion engine 20. Thereafter, the controller 100 advances the process to step S13.

Concurrently with step S13, the engine ECU 110 of the controller 100 causes the rotation torque of the motor-generator 40 to be transmitted to the internal combustion engine 20 and controls combustion in each cylinder of the internal combustion engine 20 using the ignition plug.

Thereafter, the controller 100 starts the process of step S13. This process is the same as that of step S13 in the first embodiment. When the rotation speed of the crankshaft 21 is lower than the predetermined threshold (S13: NO), the controller 100 repeats the process of step S13. In contrast, when the rotation speed of the crankshaft 21 is higher than or equal to the predetermined threshold (S13: YES), the controller 100 advances the process to step S23.

In step S23, the clutch ECU 120 of the controller 100 completes the switching of the clutch 30 from the slipping state to the engaged state when the calculated angular phase difference DP becomes 180 degrees. Thereafter, the controller 100 ends the series of processes in the balance control when starting the internal combustion engine 20 by the current operation of the motor-generator 40.

The operation of the second embodiment will now be described.

Figure 7:
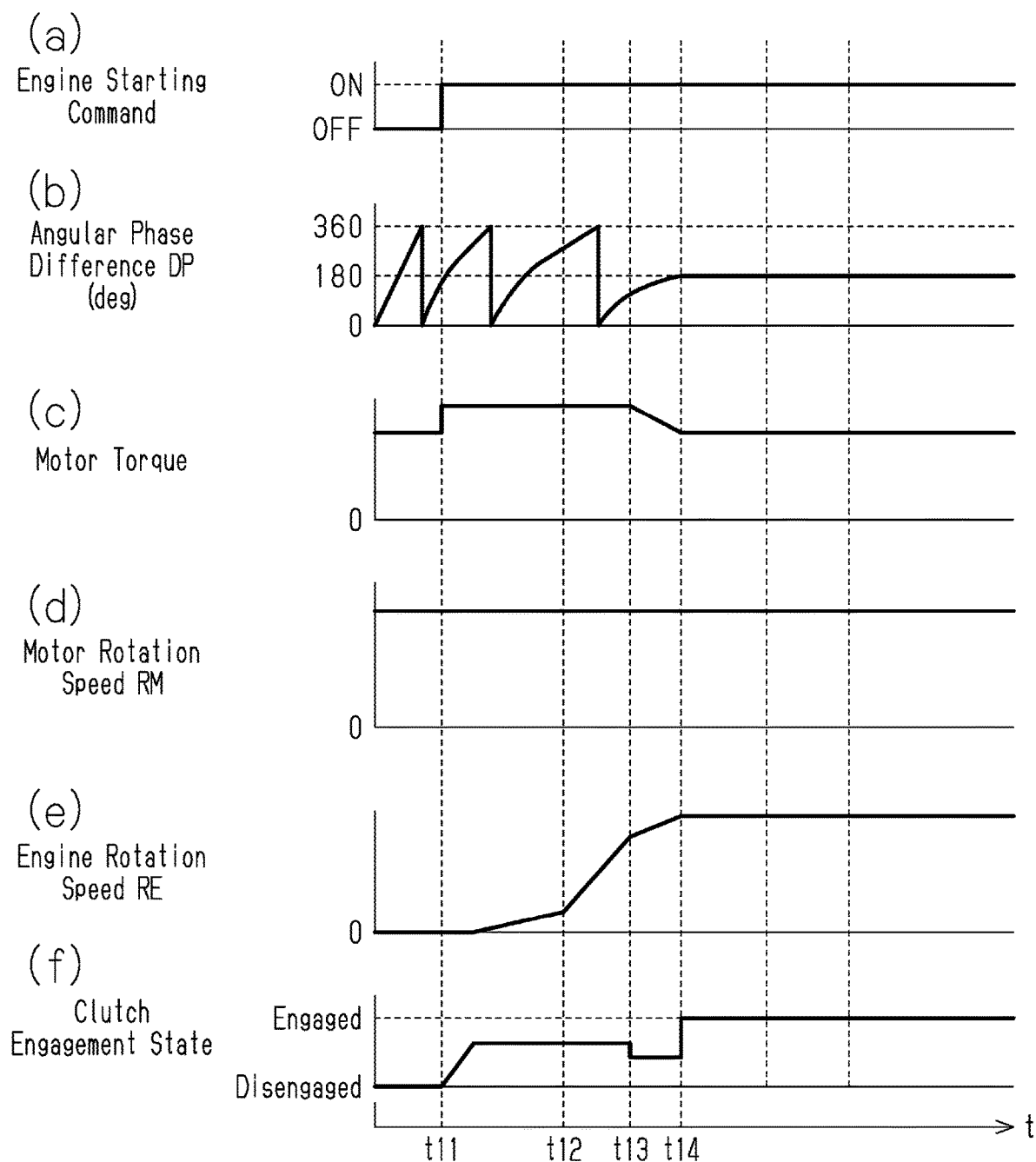
FIG. 7 is a timing diagram illustrating the second embodiment, where section (a) shows ON and OFF of the start-up command of the internal combustion engine, section (b) shows changes in the angular phase difference, section (c) shows changes in the output torque of the motor-generator, section (d) shows changes in the rotation speed of the motor-generator, section (e) shows changes in the rotation speed of the internal combustion engine, and section (f) shows the engagement state of the clutch.

As shown in section (a) of FIG. 7, before the point in time t11, at which a start-up command for starting the internal combustion engine 20 is issued, the engagement state of the clutch 30 is the disengaged state as shown in section (f) of FIG. 7. Before the point in time t11, the engine rotation speed RE, which is the rotation speed of the internal combustion engine 20, is zero as shown in section (e) of FIG. 7. That is, the internal combustion engine 20 is in a stopped state before the point in time t1. In the meantime, as shown in section (d) of FIG. 7, the motor rotation speed RM, which is the rotation speed of the motor-generator 40, has an appropriately large value. Accordingly, as shown in section (b) of FIG. 7, the angular phase difference DP changes periodically in accordance with the motor rotation speed RM of the motor-generator 40.

Thereafter, as shown in section (a) of FIG. 7, the engine ECU 110 of the controller 100 outputs a start-up command for starting the internal combustion engine 20 at the point in time t11. At the point in time t11, the clutch 30 starts being switched from the disengaged state to the slipping state as shown in section (f) of FIG. 7. Also, as shown in section (c) of FIG. 7, the output torque of the motor-generator 40 is increased by the amount necessary for starting the internal combustion engine 20 at the point in time t11.

Thereafter, when the clutch 30 is switched to the slipping state after the point in time t11 as shown in section (f) of FIG. 7, the engine rotation speed RE starts increasing as shown in section (e) of FIG. 7.

Thereafter, at the point in time t12, at which fuel injection is started in the internal combustion engine 20, combustion is started in the internal combustion engine 20, so that the engine rotation speed RE is rapidly increased as shown in section (e) of FIG. 7.

Thereafter, as shown in section (e) of FIG. 7, at the point in time t13, at which the engine rotation speed RE reaches the predetermined threshold, which is set to a value at which the internal combustion engine 20 can continue to operate in a self-sustaining manner, the output torque of the motor-generator 40 starts decreasing by the amount that was necessary for starting the internal combustion engine 20 as shown in section (c) of FIG. 7. Also, at the point in time t13, the balance control for the clutch 30 is started as shown in section (f) of FIG. 7. Specifically, slipping is executed such that the slipping amount corresponds to the amount from the calculated initial angular phase difference DP to 180 degrees. Also, at this time, the engagement state of the clutch 30 is controlled such that the angular phase difference DP becomes 180 degrees within an appropriate period of time. In the present embodiment, the slipping amount per unit time is controlled to be greater than that in the immediately preceding slipping state.

Thereafter, at the point in time t14, at which the angular phase difference DP becomes 180 degrees as shown in section (b) of FIG. 7, the clutch 30 is switched from the slipping state to the engaged state as shown in section (f) of FIG. 7. Also, at the point in time t14, the motor rotation speed RM and the engine rotation speed RE match each other as shown in sections (d) and (e) of FIG. 7.

The advantages of the above-described second embodiment will now be described. In addition to the advantage (1) of the first embodiment, the second embodiment has the following advantages.

(6) According to the second embodiment, the balance control can be employed in a situation in which start-up of the internal combustion engine 20 is initiated by driving the motor-generator 40 from a state in which the internal combustion engine 20 is in a stopped state and the motor-generator 40 is being driven.

(7) In the second embodiment, since the angular phase difference DP is constantly calculated, a slipping amount can be calculated for more accurately changing the angular phase difference DP to 180 degrees. Thus, the angular phase difference DP is readily changed to 180 degrees, at which vibration is believed to be least likely to be caused.

The above-described embodiments may be modified as follows. The above-described embodiments and the following modifications can be combined as long as the combined modifications remain technically consistent with each other.

The timing at which the balance control is started is not limited to the example described in the first embodiment. The balance control may be performed at an interval after completion of the start-up of the internal combustion engine 20 or before completion of the start-up of the internal combustion engine 20.

In the first embodiment, the clutch 30 does not need to be brought into the engaged state before the balance control is performed. For example, the balance control may be started by bringing the clutch 30 into the slipping state before the motor-generator 40 is driven. In this case, the start-up of the internal combustion engine 20 is initiated simultaneously with the start of the balance control.

The manner in which the slipping amount in the balance control is determined is not limited to the example described in the first embodiment. For example, the slipping amount that is changed through the balance control may be calculated based on the detection values of the crank angle sensor 201 and the drive shaft angle sensor 202 as in the second embodiment. The balance control may be performed while constantly calculating the angular phase difference DP. In this case, even if the engine-side center of gravity GE and the motor-side center of gravity GM are not located directly below the center of rotation C due to, for example, friction between components, the angular phase difference DP prior to the balance control can be obtained from the detection values of the crank angle sensor 201 and the drive shaft angle sensor 202. Accordingly, the slipping amount required for changing the angular phase difference DP to the 180 degrees can be accurately calculated.

The time during which the slipping state is maintained in the balance control is not limited to the example described in the first embodiment. For example, the time during which the slipping state is maintained in the balance control may be shorter than the specified time TD.

In the second embodiment, the internal combustion engine 20 may be driven before the balance control is performed. Even in this case, the angular phase difference DP can be set to 180 degrees through the balance control.

In the above-described embodiments, the time lag at switching of the clutch 30 does not necessarily need to be considered. For example, when the clutch 30 has a high responsivity, the amount of time taken for the clutch 30 to be switched from the slipping state to the engaged state is short. Thus, in the balance control, the error caused by the time lag is small even if the clutch 30 is switched from the slipping state to the engaged state when the angular phase difference DP becomes 180 degrees.

The configuration of the clutch 30 is not limited to the ones described in the above-described embodiments. The clutch 30 may have any configuration as long as the clutch 30 is capable of switching the crankshaft 21 and the drive shaft 41 among an engaged state, a slipping state, and a disengaged state.

The configurations of the engine-side rotating body 80 and the motor-side rotating body 90 are not limited to the ones described in the above-described embodiments. In each of the embodiments, one or more components may be omitted. Also, one or more additional components may be provided. The engine-side rotating body 80 may be modified as long as the engine-side rotating body 80 can bring the clutch 30 into the slipping state when the motor-generator 40 is being driven, and the engine-side rotating body 80 can rotate integrally with the crankshaft 21. Also, the motor-side rotating body 90 may be modified as long as the motor-side rotating body 90 can bring the clutch 30 into the slipping state when the motor-generator 40 is being driven, and the motor-side rotating body 90 can rotate integrally with the drive shaft 41.

The amount by which the clutch 30 is caused to slip during the balance control is not limited to the example described in each embodiment. Specifically, the amount by which the clutch 30 is caused to slip during the balance control does not necessarily need to be the amount until the angular phase difference DP becomes 180 degrees. Any value of the slipping amount may be employed as long as the balance control is completed by bringing the clutch 30 into the engaged state at a position where the angular phase difference DP becomes greater than that prior to the balance control. In order that the position of the center of gravity when the engine-side rotating body 80 and the motor-side rotating body 90 are integrated, that is, the position of the total center of gravity GA, be effectively close to the center line of rotation, it is preferable to set the slipping amount such that slipping occurs until the angular phase difference DP enters the range between 90 degrees and 180 degrees inclusive.

The configuration of the controller 100 is not limited to those described in the above-described embodiments. For example, the controller 100 may include only three or fewer ECUs. Alternatively, the controller 100 may include five or more ECUs.

In the above-described embodiments, the controller 100 is constituted by ECUs. The controller 100 can be constructed by devices that include, for example, a processor and a storing section including a ROM and execute software processing, but is not limited to this configuration. For example, at least part of the processes executed by the software in the above-described embodiments may be executed by hardware circuits dedicated to executing these processes (such as ASIC). That is, the controller 100 may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller employed in a hybrid system, wherein
  the hybrid system includes
    an internal combustion engine as a drive source,
    an electric motor as a drive source different from the internal combustion engine, and
    a clutch that is disposed between a crankshaft of the internal combustion engine and a drive shaft of the electric motor,
  the clutch is configured to be switched among
    an engaged state, in which rotation torque is transmitted between the crankshaft and the drive shaft without relative rotation between the crankshaft and the drive shaft,
    a slipping state, in which rotation torque is transmitted between the crankshaft and the drive shaft with relative rotation between the crankshaft and the drive shaft, and
    a disengaged state, in which rotation torque cannot be transmitted between the crankshaft and the drive shaft,
  the hybrid system includes
    an engine-side rotating body that rotates integrally with the crankshaft, and
    a motor-side rotating body that rotates integrally with the drive shaft, the controller is configured to perform balance control, and
  in the balance control, the controller
    causes the engine-side rotating body and the motor-side rotating body to rotate relative to each other by bringing the clutch into the slipping state, and then
    switches the clutch to the engaged state such that a position of a center of gravity of the engine-side rotating body and a position of a center of gravity of the motor-side rotating body are farther from each other in a circumferential direction than before bringing the clutch into the slipping state.

2. The controller according to claim 1, wherein the controller is configured to perform the balance control in response to the internal combustion engine being started by driving the electric motor in a state in which the internal combustion engine and the electric motor are both in a stopped state.

3. The controller according to claim 2, wherein
the controller is configured to
bring the clutch into the engaged state before the electric motor is driven when the internal combustion engine is started, and
perform the balance control after the starting of the internal combustion engine is completed by driving the electric motor.

4. The controller according to claim 2, wherein the controller is configured to start the balance control simultaneously with completion of the starting of the internal combustion engine.

5. The controller according to claim 2, wherein
the clutch includes a clutch disk configured to transmit rotation torque by friction,
a center of gravity of the clutch disk is on a center line of rotation in the slipping state of the balance control,
specified time is defined in advance as an amount of time taken for the center of gravity of the clutch disk to reach the center line of rotation in the slipping state of the balance control, and
the controller is configured to cause time during which the clutch is in the slipping state in the balance control to be longer than or equal to the specified time.

6. A control method for a hybrid system, wherein
the hybrid system includes
an internal combustion engine as a drive source,
an electric motor as a drive source different from the internal combustion engine, and
a clutch that is disposed between a crankshaft of the internal combustion engine and a drive shaft of the electric motor,
the clutch is configured to be switched among
an engaged state, in which rotation torque is transmitted between the crankshaft and the drive shaft without relative rotation between the crankshaft and the drive shaft,
a slipping state, in which rotation torque is transmitted between the crankshaft and the drive shaft with relative rotation between the crankshaft and the drive shaft, and
a disengaged state, in which rotation torque cannot be transmitted between the crankshaft and the drive shaft,
the hybrid system includes
an engine-side rotating body that rotates integrally with the crankshaft, and
a motor-side rotating body that rotates integrally with the drive shaft, the control method includes performing balance control, and
in the balance control, the control method comprises:
causing the engine-side rotating body and the motor-side rotating body to rotate relative to each other by bringing the clutch into the slipping state; and
after causing the engine-side rotating body and the motor-side rotating body to rotate relative to each other, switching the clutch to the engaged state such that a position of a center of gravity of the engine-side rotating body and a position of a center of gravity of the motor-side rotating body are farther from each other in a circumferential direction than before bringing the clutch into the slipping state.

7. A non-transitory computer readable medium that stores a program for causing a controller to execute a control process for a hybrid system, wherein
the hybrid system includes
an internal combustion engine as a drive source,
an electric motor as a drive source different from the internal combustion engine, and
a clutch that is disposed between a crankshaft of the internal combustion engine and a drive shaft of the electric motor,
the clutch is configured to be switched among
an engaged state, in which rotation torque is transmitted between the crankshaft and the drive shaft without relative rotation between the crankshaft and the drive shaft,
a slipping state, in which rotation torque is transmitted between the crankshaft and the drive shaft with relative rotation between the crankshaft and the drive shaft, and
a disengaged state, in which rotation torque cannot be transmitted between the crankshaft and the drive shaft,
the hybrid system includes
an engine-side rotating body that rotates integrally with the crankshaft, and
a motor-side rotating body that rotates integrally with the drive shaft, the control process includes performing balance control, and
the balance control includes
causing the engine-side rotating body and the motor-side rotating body to rotate relative to each other by bringing the clutch into the slipping state, and
after causing the engine-side rotating body and the motor-side rotating body to rotate relative to each other, switching the clutch to the engaged state such that a position of a center of gravity of the engine-side rotating body and a position of a center of gravity of the motor-side rotating body are farther from each other in a circumferential direction than before bringing the clutch into the slipping state.

* * * * *